Aug. 7, 1951          I. NESSON          2,563,356
WIPER BLADE CONNECTOR
Filed Jan. 7, 1947          2 Sheets-Sheet 1
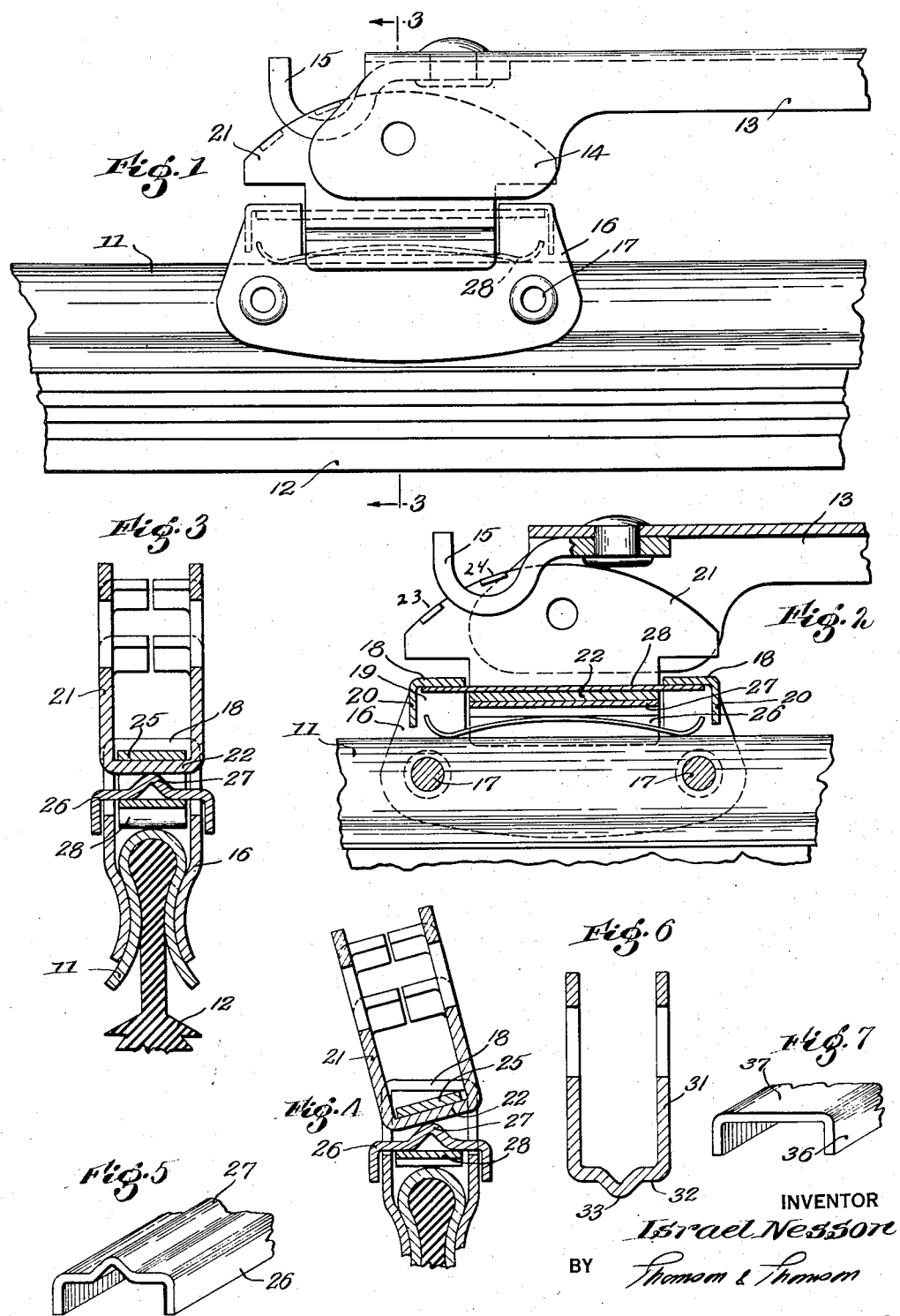
INVENTOR
Israel Nesson
BY Thomson & Thomson
ATTORNEYS

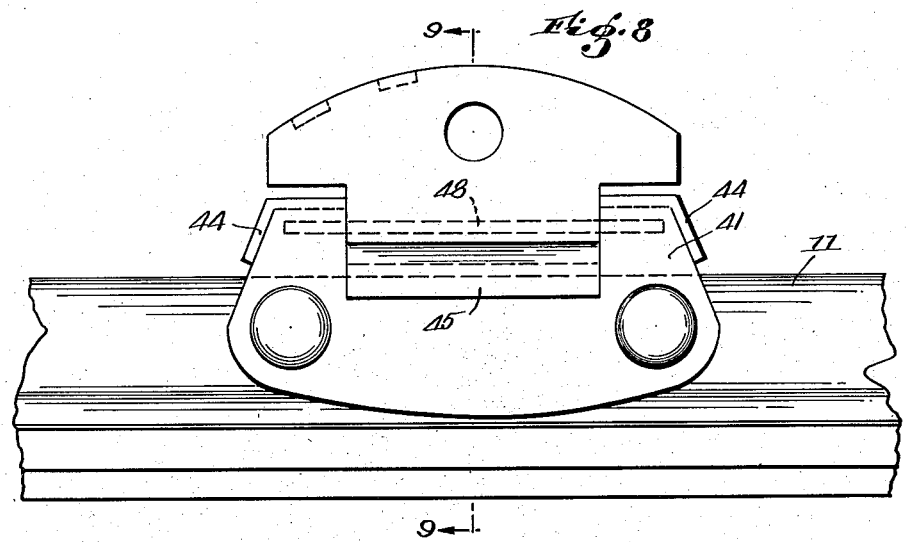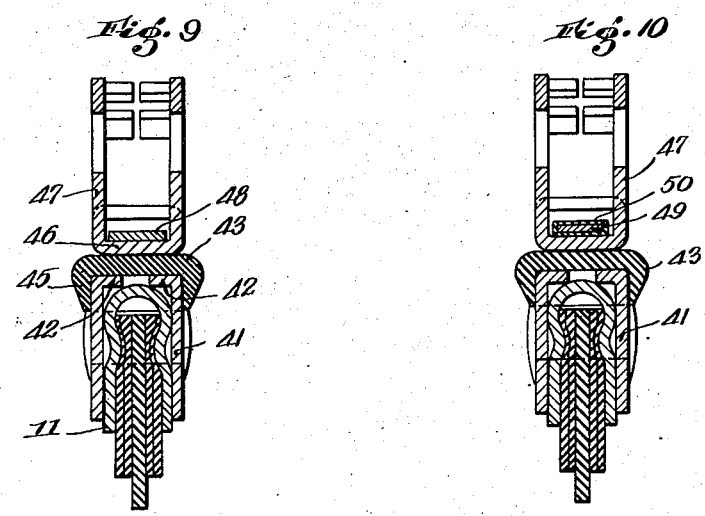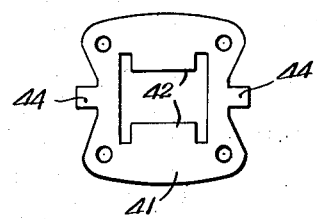

Patented Aug. 7, 1951

2,563,356

UNITED STATES PATENT OFFICE 2,563,356

WIPER BLADE CONNECTOR

Israel Nesson, Lynn, Mass., assignor to Max Zaiger, Swampscott, Mass.

Application January 7, 1947, Serial No. 720,645

3 Claims. (Cl. 15—250)

This invention relates to improvements in wiper blade connectors or clips for separably attaching a windshield wiper arm to a wiper blade, and pertains more particularly to improvements in a rocking type of connector of the character disclosed in the Zaiger Patents Nos. 2,234,791, dated March 11, 1941, and 2,280,566, dated April 21, 1942.

The said patents describe a rocking connector comprising a sub-clip fixedly attached to the conventional wiper blade, and a clip member hinged to the sub-clip and adapted to be removably engaged by the end of the wiper arm; and the first of said patents shows an intervening spring member reacting upon and tending to hold these parts in normal position with the clip disposed in the plane of the blade.

The patented connectors are generally satisfactory and efficient in use, but I have found that optimum performance and silent operation is obtained by providing means ensuring a more positive and smoother-acting pivotal connection between the clip and the sub-clip, while the hinged parts of these members are yieldingly urged into contact by a spring or other resilient member.

It is, therefore, the principal purpose of the present invention to improve the performance and durability and to reduce if not eliminate the noise or chattering resulting from the intermittent lateral rocking motion of the clip in a connector of the type indicated.

A further object of the invention is to provide a resilient saddle element between the rocking clip and the sub-clip, thereby cushioning the rocking movement of the clip while at the same time maintaining continuous contact therewith.

Recommended embodiments of the invention are illustrated in the accompanying drawings, in which:

Fig. 1 is a fragmentary side elevation of a wiper blade and wiper arm, separably coupled by the improved pivotal connector;

Fig. 2 is a central longitudinal section of the connector shown in Fig. 1, with the wiper blade and arm hook in elevation;

Fig. 3 is an enlarged transverse section on line 3—3 of Fig. 1, with the wiper arm omitted;

Fig. 4 is a fragmentary section similar to Fig. 3, but showing the clip disposed at an angle to the blade and sub-clip;

Fig. 5 is a fragmentary perspective of a ridged, hinge bar or saddle forming part of the connector and serving to ensure smooth pivotal action of the clip;

Fig. 6 is a transverse section of a modified form of clip having a ridge formed on its base;

Fig. 7 is a fragmentary perspective of a hinge bar used with the clip of Fig. 6 in providing an optional form of pivotal connector;

Fig. 8 is a view similar to Fig 1 (with the wiper arm omitted), showing a modified form of connector;

Fig. 9 is an enlarged section of line 9—9 of Fig. 8;

Fig. 10 is a view similar to Fig. 9 illustrating a further modification; and

Fig. 11 is a plan view of a blank used in making the sub-clip shown in Figs. 8 to 10.

The improved connector may be applied to any conventional wiper blade and may be used with wiper arms having hooked ends, U-shaped attaching portions, or both, as explained in the aforesaid patents. As here shown, the wiper blade comprises a U-shaped holder or shell 11 of sheet metal, and a rubber wiper strip 12 suitably secured therein; and the wiper arm 13 is provided with a U-shaped end 14 and a hook piece 15, to which the connector clip is attached as set forth in said Zaiger patents.

In Figs. 1 to 5 of the drawings, the connector comprises a sub-clip 16 of U-shaped configuration, having its sides embracing the blade shell 11 and secured thereto as by rivets 17 passing through the shell and the rubber wiper. The top of the sub-clip is cut away in its central region to provide spaced bridge members 18 disposed at its respective ends and defining underlying pockets 19 which are partially closed by depending end tabs 20.

The clip member 21 is stamped from sheet metal in generally inverted U-shape form, to provide parallel sides upstanding from a flat base 22. The clip sides have pairs of inwardly directed tongues 23 and 24, between which the arm hook 15 is received when the sides 14 of the arm end straddle the clip in the conventional manner.

The base portion 22 of the clip is received in the space between the bridge members 18 of the sub-clip 16, and a connecting bar 25 is inserted between said base 22 and said bridge members, loosely to hinge the parts together with the base 22 remote from the top of the blade shell 11.

A metal saddle 26 having a central longitudinal ridge 27 straddles the sides of the sub-clip within the space between its end or bridge members, with the pointed ridge 27 directed toward the clip base 22 against which it is urged by a leaf spring 28 interposed between said saddle and the top of the shell 11. The spring is substantially curved, as contrasted with the relatively flat spring of Patent 2,234,791, to permit depression of the saddle while maintaining continuous contact between its ridge 27 and the clip base 22, when the clip is rocked sideways, as illustrated in Fig. 4.

The movable parts are thus maintained in constant yielding engagement, without the looseness which causes noisy chattering while the wiper is in operation, and swing on a pivotal bearing which ensures smooth rocking action and contributes to efficiency and durability of the connector.

An optional means of affording the pivotal bearing is shown by the modified parts of Figs. 6 and 7, in which the clip 31 has its base 32 formed with a longitudinal ridge 33; and the saddle 36 has a flat and smooth top 37. It will be appreciated that this optional reversal of the location of the ridge achieves the same result; but that it is usually more economical to form the ridge on the saddle 26, as in Figs. 1 to 5.

A further modification of the saddle member is illustrated in the optional forms of connectors shown in Figs. 8 to 10. In this form, the sub-clip 41 is attached to the shell 11 of the wiper blade and serves the same purpose as the sub-clip 16 of the previous views, but its top is provided with inwardly directed tongues 42 which afford a broader base for a modified type of saddle member 43. The configuration of the tongues 42 and also of the end tabs 44 of the sub-clip 41 is best indicated in Fig. 11 showing a stamped out blank from which the sub-clip is produced by bending down its sides and end tabs.

The saddle 43 is made of relatively thick rubber or other suitably resilient material, and has depending sides 45 which embrace and preferably grip the sides of the sub-clip when the saddle is applied to the tongues 42 at the top. The saddle thus affords a broad, resilient base on which the base 16 of the clip 47 rests, or swings during its rocking movement, thereby cushioning the pivotal action, while ensuring continuous contact with the clip base 46. The resilient cushion 43 thus affords smooth and silent operation of the wiper connector, and obviates the need of a separate spring member, such as the spring 28 of the principal views.

The clip 47 is substantially identical to the clip 21 of Figs. 1 to 5, and is pivotally connected to the sub-clip 41 by a hinge bar 48, corresponding to the bar 25 of the preceding views.

In the additional modification of Fig. 10, the hinge bar 49 has a covering 50 of rubber or other resilient material, thereby further contributing to the silent operation of the connector as a whole.

It will be apparent from the foregoing, that each of the optional forms of the invention herein disclosed provides an efficient connector which is easy and economical to manufacture, assemble and attach to a wiper blade, and in which the relatively movable parts of the connector are yieldingly held in continuous engagement and cushioned against the excessive chattering or noise which would result if the relationship of the parts permitted play or lost motion during operation. In Figs. 1 to 7, the cushioning action is afforded by the spring 28 which yieldingly presses the saddle 26 against the base 22 of the clip; whereas in Figs. 8 to 11, it is supplied by the inherent resiliency of the rubber saddle 43 which is continuously engaged by the base 46 of the rocking clip, and also (in Fig. 10) by the rubber covering 50 of the bridge member 49.

I claim:

1. A connector for attaching a wiper arm to a wiper blade, comprising a sub-clip connectable to the blade and having transversely spaced sides and longitudinally spaced bridge members integral with the sides adjacent the ends thereof and defining underlying pockets, a rocking clip connectable to the wiper arm and having spaced sides and an integral base received between said bridge members, a hinge bar disposed between the sides of the clip and having ends projecting into said pockets beneath the bridge members for connecting the clip to the sub-clip, a saddle member received between the bridge members beneath the base of said clip, and a spring member disposed between said saddle and the top of the wiper blade and pressing the saddle against the clip base, the saddle and the clip base having abutting surfaces and one of said surfaces having a relatively narrow longitudinal, pointed ridge of substantial length, said ridge constituting a pivotal bearing on the other surface during rocking motion of the clip.

2. A connector for attaching a wiper arm to a wiper blade, comprising a sub-clip connectable to the blade and having transversely spaced sides and longitudinally spaced bridge members integral with the sides adjacent the ends thereof and defining underlying pockets, a rocking clip connectable to the wiper arm and having spaced sides and an integral base received between said bridge members, a hinge bar disposed between the sides of the clip and having ends projecting into said pockets beneath the bridge members for connecting the clip to the sub-clip, a saddle member received between the bridge members beneath the base of said clip, and a spring member disposed between said saddle and the top of the wiper blade and pressing the saddle against the clip base, the clip base having a flat surface and the saddle having a relatively narrow, longitudinal, pointed ridge extending along its upper surface, said ridge providing a pivotal bearing on the flat surface of the clip during rocking motion thereof.

3. A connector for attaching a wiper arm to a wiper blade, comprising a sub-clip connectable to the blade and having transversely spaced sides and longitudinally spaced bridge members integral with the sides adjacent the ends thereof and defining underlying pockets, a rocking clip connectable to the wiper arm and having spaced sides and an integral base received between said bridge members, a hinge bar disposed between the sides of the clip and having ends projecting into said pockets beneath the bridge members for connecting the clip to the sub-clip, a saddle member received between the bridge members beneath the base of said clip, and a spring member disposed between said saddle and the top of the wiper blade and pressing the saddle against the clip base, the base of the clip having a relatively narrow downwardly projecting ridge engaging the upper surface of the saddle and providing a pivotal bearing thereon during rocking motion of the clip.

ISRAEL NESSON.

REFERENCES CITED

The following references are of record in the file of this patent:

UNITED STATES PATENTS

| Number | Name | Date |
|---|---|---|
| 2,147,113 | Smulski | Feb. 14, 1939 |
| 2,172,938 | Anderson | Sept. 12, 1939 |
| 2,280,566 | Zaiger | Apr. 21, 1942 |
| 2,285,618 | Scinta | June 9, 1942 |
| 2,399,399 | Smulski | Apr. 30, 1946 |